United States Patent
Abdeljaoud et al.

(10) Patent No.: US 6,690,725 B1
(45) Date of Patent: Feb. 10, 2004

(54) METHOD AND A SYSTEM FOR GENERATING SUMMARIZED VIDEO

(75) Inventors: Yousri Abdeljaoud, Lausanne (CH); Touradj Ebrahimi, Lausanne (CH); Charilaos Christopoulos, Sollentuna (SE); Ignacio Mas Ivars, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 430 days.

(21) Appl. No.: 09/593,819

(22) Filed: Jun. 15, 2000

(30) Foreign Application Priority Data

Jun. 18, 1999 (SE) ................................................ 9902328

(51) Int. Cl.[7] ................................................ H04N 7/18
(52) U.S. Cl. .................... 375/240.08; 348/700; 348/701
(58) Field of Search ....................... 375/240.08–240.29; 348/699, 700, 701

(56) References Cited

U.S. PATENT DOCUMENTS

| | | | |
|---|---|---|---|
| 5,635,982 A | | 6/1997 | Zhang et al. |
| 5,767,922 A | | 6/1998 | Zabih et al. |
| 5,995,095 A | * | 11/1999 | Ratakonda ............... 715/500.1 |
| 6,366,699 B1 | * | 4/2002 | Kuwano et al. ............ 382/199 |
| 6,404,925 B1 | * | 6/2002 | Foote et al. ................ 382/224 |

OTHER PUBLICATIONS

*International Conference on Acoustics, Speech, and Signal Proc.* (Princeton University), 1996, vol. 2, pp. 1228–1231, Wayne Wolf, "Key Frame Selection by Motion Analysis".

*International Workshop on Multi–Media Database Management* . . . , 1998, pp. 80–87, Suchendra M. Bhandarkar et al., Motion–based Parsing Compressed Video.

*IEEE International Conference on Multimedia Computing and Systems*, 1999, vol. 2, pp. 710–714Alan Hanjalic et al., "Optimal Shot Boundary Detection based on Robust Statistical Models".

*International Conference on Acoustics, Speech and Signal Processing*, vol. 2, 1996, Princeton University, Wayne Wolf, Key Frame Selection by Motion Analysis, pp. 1228–1231.

*International Workshop on Multi–Media Database Management* . . . , vol., 1998, Suchendra M bhandarkar, Aparna A. Khombhadia, "Motion Based Parsing of Compressed Video," pp. 80–87.

*IEEE International Conference on Multimedia Computing and Systems*, vol. 2, 1999, Delft University, The Netherlands, Alan Hanjalic, Hong Jiang Zhang, "Optimal Shot Boundary Detection based on Robust Statistical Models," pp. 710–714.

* cited by examiner

*Primary Examiner*—Andy Rao
(74) *Attorney, Agent, or Firm*—Nixon & Vanderhye, P.C.

(57) ABSTRACT

An algorithm for video summarization is described. The algorithm combines photometric and motion information. According to the algorithm, the correspondence between feature points is used to detect shot boundaries and to select key frames. Thus, the rate of feature points, which are lost or initiated, is used as an indication if a shot transition occurred or not. Key frames are selected as frames where the activity change is low.

21 Claims, 5 Drawing Sheets

One iteration of the tracking of feature points

*One iteration of the tracking of feature points*

Shot boundary detection

*Activity change according to the time.*

A set of consecutive frames with detected feature points. (top left) frame 537, (top right) frame 540, (bottom left) frame 541, (bottom right) frame 542.

METHOD AND A SYSTEM FOR GENERATING SUMMARIZED VIDEO

TECHNICAL FIELD

The present invention relates to a method and a system for video summarization, and in particular to a method and a system for key frame extraction and shot boundary detection.

BACKGROUND OF THE INVENTION AND PRIOR ART

Recent developments in personal computing and communications have created new classes of devices such as hand-held computers, personal digital assistants (PDAs), smart phones, automotive computing devices, and computers that allow users more access to information.

Many of the device manufacturers, including cell phone, PDA, and hand-held computer manufacturers, are working to grow the functionalities of their devices. The devices are being given capabilities of serving as calendar tools, address books, paging devices, global positioning devices, travel and mapping tools, email clients, and Web browsers. As a result, many new businesses are forming around applications related to bringing all kinds of information to these devices. However, due to the limited capabilities of many of these devices, in terms of the display size, storage, processing power, and network access, there are new challenges for designing the applications that allow these devices to access, store and process information.

Concurrent with these developments, recent advances in storage, acquisition, and networking technologies has resulted in large amounts of rich multimedia content. As a result, there is a growing mismatch between the rich content that is available and the capabilities of the client devices to access and process it.

In this respect so called key-frame based video summarization is an efficient way to manage and transmit video information. This representation can be used within the MPEG-7 application Universal Multimedia Access as described in C. Christopoulos et al., "MPEG-7 application: Universal access through content repurporsing and media conversion", Seoul, Korea, March 1999, ISO/IEC/JTC1/SC29/WG11 M4433, in order to adapt video data to the client devices.

For Audio-Visual material, the key frame extraction could be used in order to adapt to bandwidth and computational capabilities of the clients. For example, low bandwidth or low capability clients might request only the audio information to be delivered, or only he audio combined with some key frames. High bandwidth and computational efficient clients can request the whole AV material. Another application is fast browsing to digital video. Skipping video frames at fixed intervals reduce the video viewing time. However this merely gives a random sample of the overall video.

Below the following definitions will be used:

Shot

A shot is defined as a sequence of frames captured by one camera in a single continuous action in time and space, see also J. Monaco, "How to read a film," Oxford press, 1981.

Shot Boundary

There are a number of different types of boundaries between shots. A cut is an abrupt shot change that occurs in a single frame. A fade is a gradual change in brightness resulting in (fade-out) or starting with a black frame (fade-in). A dissolve occurs when the images of the first shot become dimmer and the images of the second shot become brighter, with frames within the transition showing one image superimposed on the other one. A wipe occurs when pixels from the second shot replace those of the first shot in a regular pattern such as a line from the left edge of the frames.

Key Frame

Key frames are defined inside every shot. They represent with a small number of frames, the most relevant information content of the shot according to some subjective or objective measurement.

Conventional video summarization consists of two steps:
1. Shot boundary detection.
2. Key-frame extraction.

Many attributes of the frames such as colour, motion and shape have been used for video summarization. The standard algorithm for shot boundary detection in video summarization is based on histograms. Histogram-based techniques are shown to be robust and effective as described in A. Smeulders and R. Jain, "Image databases and Multi-Media search", Singapore, 1988, and in J. S. Boreczky, and L. A. Rowe, "Comparison of Video Shot Boundary Detection Techniques",Storage and Retrieval for Image and Video Databases IV, Proc. of IS&T/SPIE 1996 Int'l Symp. on Elec. Imaging: Science and Technology, San Jose, Calif., February 1996.

Thus, the colour histograms of two images are computed. If the Euclidean distance between the two histograms is above a certain threshold, a shot boundary is assumed. However, no information about motion is used. Therefore, this technique has drawbacks in scenes with camera and object motion.

Furthermore, key frames must be extracted from the different shots in order to provide a video summary. Conventional key frame extraction algorithms are for example described in: Wayne Wolf, "Key frame selection by motion analysis", in Proceedings, ICASSP 96, wherein the optical flow is used in order to identify local minima of motion in a shot. These local minima of motion are then determined to correspond to key frames. In W. Xiong, and J. C. M. Lee, and R. H. Ma, "Automatic video data structuring through shot partitioning and key-frame selection", Machine vision and Applications, vol.10, no. 2, pp. 51–65, 1997, a seek-and-spread algorithm is used where the previous key-frame as a reference for the extraction of the next key-frame. Also, in R. L. Lagendijk, and A. Hanjalic, and M. Ceccarelli, and M. Soletic, and E. Persoon, "Visual search in a SMASH system", Proceedings of IEEE ICIP 97, pp. 671–674, 1997, a cumulative action measure of shots in order to compute the number and the position of key-frames allocated to each shot is used. The action between two frames is computed via a histogram-difference. One advantage of this method is that the number of key-frames can be pre-specified.

SUMMARY

It is an object of the present invention to provide a method and a system for shot boundary detection and key frame extraction, which can be used for video summarization and which is robust against camera and object motion.

This object and others are obtained by a method and a system for key frame extraction, where a list of feature points is created. The list keeps track of individual feature points between consecutive frames of a video sequence.

In the case when many new feature points are entered on the list or when many feature points are removed from the list between two consecutive frames a shot boundary is determined to have occurred. A key frame is then selected between two boundary shots as a frame in the list of feature points where no or few feature points are entered or lost in the list.

By using such a method for extracting key frames from a video sequence motion in the picture and/or camera motion can be taken into account. The key frame extraction algorithm will therefore be more robust against camera motion.

BRIEF DESCRIPTION OF THE DRAWINGS

The present invention will now be described in more detail and with reference to the accompanying drawings, in which.

DETAILED DESCRIPTION

Figure 1A:
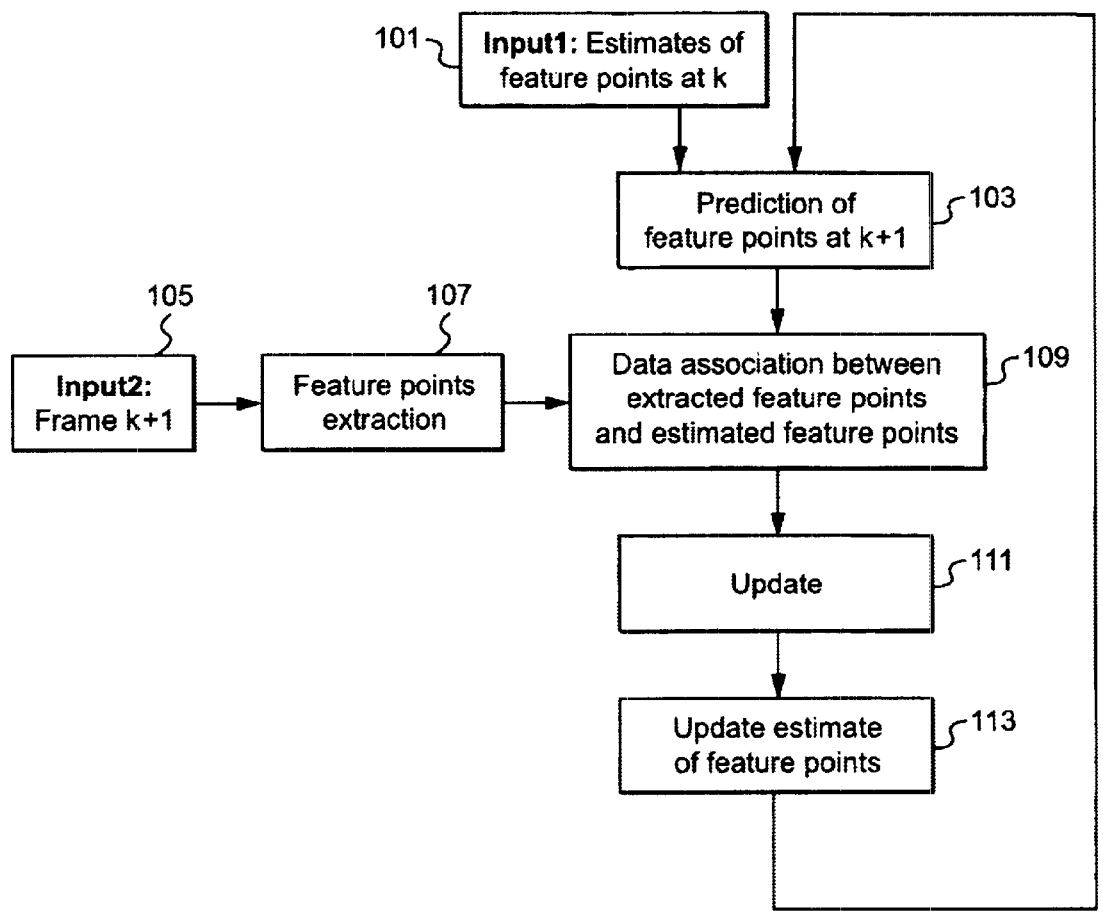
FIGS. 1a and 1b are flow charts illustrating an algorithm for shot boundary detection.
Figure 1B:
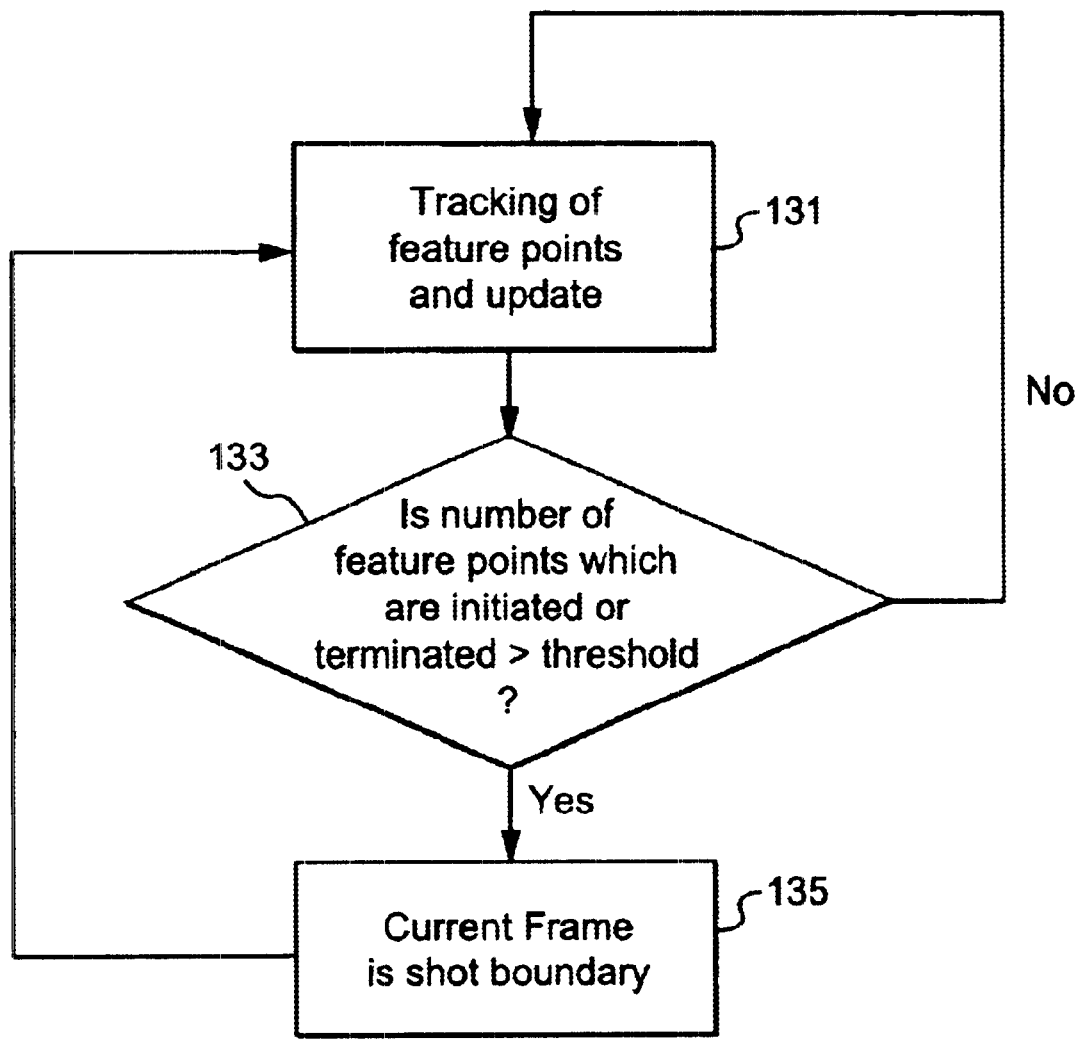

In FIGS. 1a and 1b, flow charts illustrating the steps carried out during one iteration in an algorithm for shot boundary detection according to a first preferred embodiment are shown.

Thus, with reference to FIG. 1a, first in a block 101 a first frame is input and the feature points of the first frame are extracted, and used as input in order to predict the feature points of the next frame. Next, in a block 103, a prediction of the feature points for the next frame is calculated. Thereupon, in a block 105 the next frame is input, and the feature points of the next frame are extracted in a block 107 using the same feature point extraction algorithm as in block 101.

Many algorithms have been described for extracting such feature points, which could correspond to corner points. For example B. Lucas and T. Kanade, "An iterative image registration technique with an application to stereo vision", in Proc. 7th Int. Joint Conf. on Artificial Intelligence, 1981, pp. 674–679 describes one such method. Also, the method as described in S. K. Bhattacharjee, "Detection of feature points using an end-stopped wavelet", submitted to IEEE Trans. On Image Processing 1999, can be used.

Next, in a block 109, a data association between estimated feature points and feature points extracted in block 107 is performed. An update of the list of feature points is then performed in a block 111. Thereupon, an update of the estimate for each feature point on the list of feature points is performed in a block 113. Finally the algorithm returns to block 103 and the next frame is input in the block 105 in order to perform a data association between the current estimated feature points and the feature points of the next frame.

Each time, the algorithm in FIG. 1a updates the list of feature points in the block 111 it is checked if a shot boundary has occurred. This shot boundary detection procedure is illustrated in FIG. 1b. Thus, first in a block 131, the updated list is input. A comparison between the current list of feature points and the list of previous feature points is then performed in a block 133.

If the number of lost feature points from the previous list of feature points or if the number of new feature points in the current list of feature points is larger than a pre-set threshold value, the procedure proceeds to a block 135, where the current frame is indicated as a shot-boundary.

The procedure then returns to the block 131. If, on the other hand, it is decided in the block 133 that the current frame does not correspond to a shot boundary the procedure return directly to the block 131.

Figure 2:
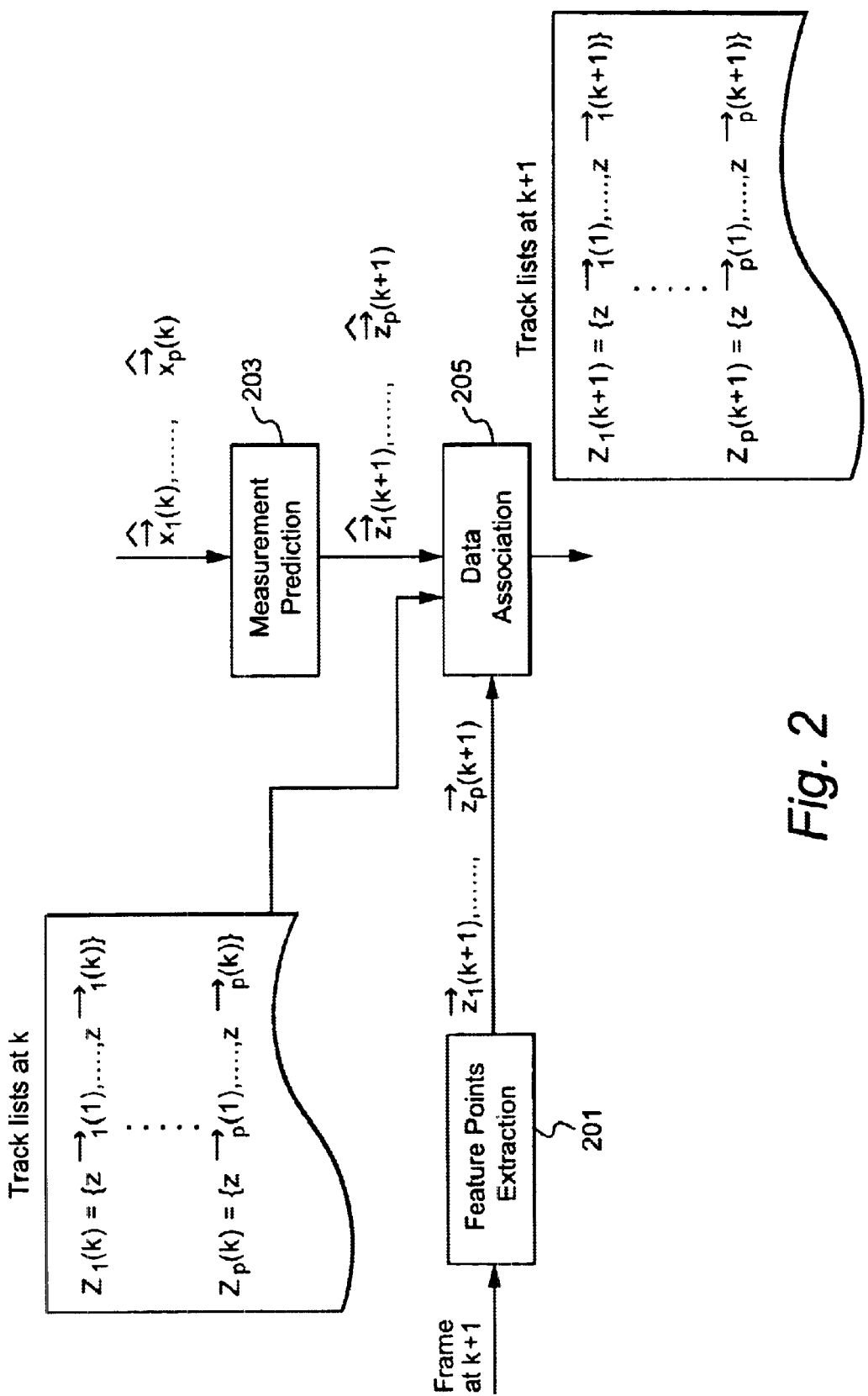
FIG. 2 is a block diagram illustrating the basic blocks of an apparatus for tracking feature points in consecutive video frames.

In FIG. 2, a block diagram of one iteration of an algorithm for key frame extraction using the shot boundary detection procedure as described in conjunction with FIGS. 1a and 1b is shown. A frame at time k is represented with a set of P feature points $\vec{x}_n(k), n=1, 2, \ldots, P$, which can consist of:

Kinematic components: position (x,y) and velocity $(\dot{x}, \dot{y})$.

Photometric components, such as Gabor responses $(f_1, f_2, f_3, \ldots)$.

Where the number of feature points P of variable n representing a particular feature point at time k (or frame k) is a function of time.

Photometric components are in general filter responses such as Gabor responses or Gaussian-derivative responses, computed by using the image intensities as input, see J. Malik, and P. Perona, "Preattentive texture discrimination with early vision mechanisms", J. Opt. Soc. Am., vol.7, no. 5, pp. 923–932, May 1990. The use of photometric components in the algorithm as described herein will improve the scaling and rotation sensitivity in extraction of the feature points, but is optional. The feature vector $\vec{x}_n(k)=(x,y,\dot{x},\dot{y},f_1,f_2,\ldots)$ is also referred to as state vector. Its components summarize current and past history of the feature point n in order to predict its future trajectory.

Feature points correspond to points, which contain a significant amount of texture, such as corner points. Such points are relatively easy to track.

Referring to FIG. 2, first in a block 201 at a feature points extraction stage, the vector $\vec{z}_n(k+1)=(x,y,f_1,f_2,\ldots)$ denoted as the n:th measurement vector at time k+1 is computed, n=1,2, . . . ,P.

Next, in a measurement prediction stage in block 203, $\hat{\vec{z}}_n(k+1)$ is estimated given the predicted state vector $\hat{\vec{x}}_n(k)$ of the last frame k. Kalman filtering as described in A. Gelb, "Applied optimal estimation", MIT Press, 1974 can be used as estimation algorithm.

Next, in a block 205 the correspondence between the predicted measurements $\hat{\vec{z}}_n(k+1)$ and the extracted measurements $\vec{z}_n(k+1)$ is performed followed by an update of the list of feature points.

$Z_n(k+1)=\{\vec{z}_n(1), \vec{z}_n(2), \ldots, \vec{z}_n(k+1)\}$ represents the n:th list of feature points up to time k+1. The Nearest Neighbour filter as described in Y. Bar-Shalom, and T. E. Fortmann, "Tracking and data association", Academic Press, 1988 can be used for data association in order to update the list of feature points. The estimated measurement vectors $\hat{\vec{z}}_n(k+1)$, the list of feature points $Z_n(k)$ from the last frame k and the measurement vectors $\vec{z}_n(k+1)$ from the current frame k+1 are used as inputs for the data association step. It is important to note that the number P of feature points may vary in time. This is due to the fact that each data association cycle may include initiation of feature points, termination of feature points as well as maintenance of feature points.

A definition for the different types of processing of feature points is given below.

1. Feature point initiation: Creation of new feature points as new feature points are extracted.

2. Feature point termination: Removal of a feature point when the feature point is no longer extracted.

3. Feature point maintenance: Update of a feature point when the corresponding feature point is extracted.

Finally, when many feature points are terminated (for instance in cut, fade-in, dissolve, or wipe situations) or initiated (for instance in cut, fade-out, dissolve, or wipe situations) at the same time, the frame is determined to correspond to a shot boundary.

Furthermore, an activity measure for the rate of change in feature points in order to detect shot boundaries can be defined. Such a measurement will in the following be termed activity change. This activity measure then depends on the number of terminated or initiated feature points between consecutive frames. The measure can, for example, be defined as the maximum between terminated and initiated feature points calculated as a percentage. The percentage of initiated feature points is the number of new feature points divided by the total number of feature points in the current frame. The percentage of terminated feature points is the number of removed feature points divided by the total number of feature points in the previous frame.

A suitable threshold value is set and if the maximum between terminated and initiated feature points is above the threshold value, a shot boundary is determined to have occurred. Other definitions of activity change are of course also possible.

Figure 4:
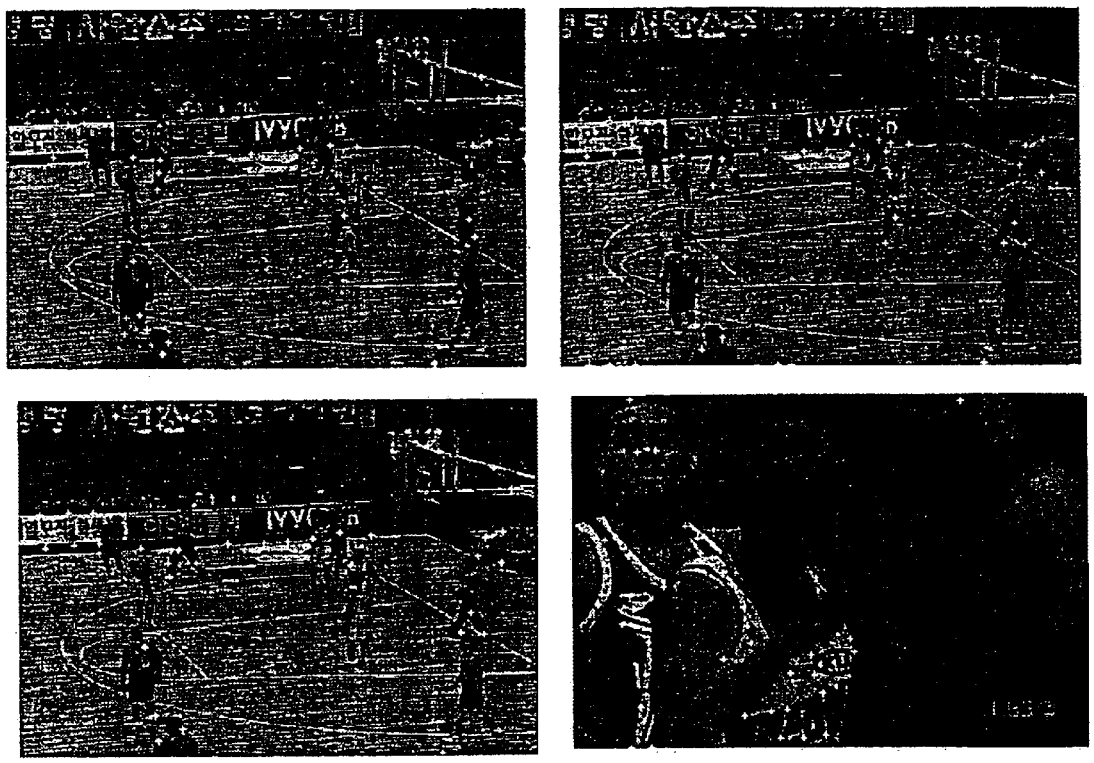
FIG. 4 shows a set of consecutive frames with detected feature points.

In FIG. 4, the detected feature points in a set of consecutive frames k (537), k+1 (540), k+2 (541), k+3 (542) are shown. In frame k+1 (540) most of the feature points from frame k (537) are detected. Meanwhile, few points ceased to exist and a small number of points appeared for the first time. At frame k+3 (542) most of the feature points are lost. Therefore this frame is determined to correspond to a shot boundary (cut).

Figure 3:
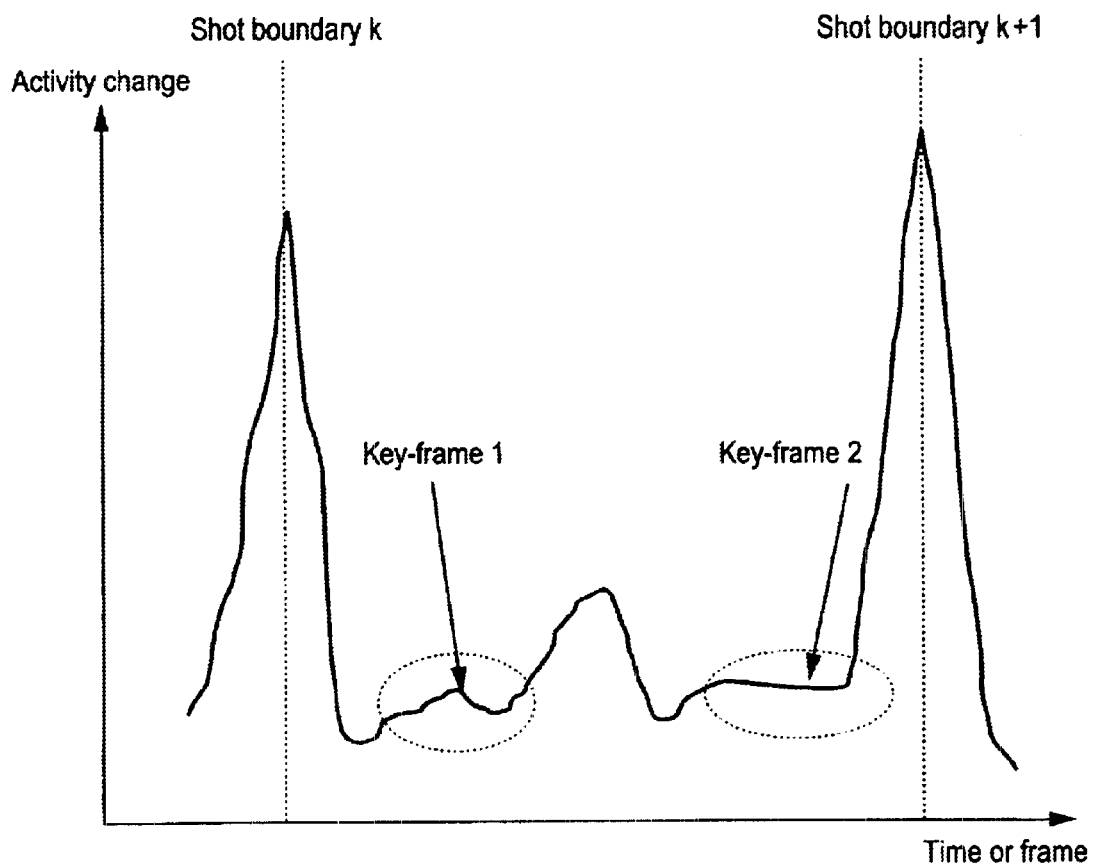
FIG. 3 is a diagram illustrating the activity change within a shot.

Experiments show that a shot consists of a set of successive stationary states with the most important information content. The transition between two states corresponds to a peak in the activity change as can be seen in FIG. 3. In FIG. 3, the activity change as a function of time (or frames) is shown. The stationary states, i.e. flat parts with low activity change are detected and used to extract the key-frames.

With reference again to FIG. 4, in frame k+1 (540) most of the feature points from frame k (537) are detected. Meanwhile, few points ceased to exist and a small number of points appeared for the first time. Therefore, the frame k+1 can be a suitable key frame.

Thus, once the shot boundaries are determined using the algorithm as described above, one or several of the local minima between the shot boundaries are extracted as key-frames. The local minima have been shown to occur where the activity change is constant. It is therefore not necessary to extract the frame corresponding to the local minima per se, but any frame where the activity change is constant provides a good result. However, frames corresponding to the local minima in activity change between shot boundaries should provide the best result.

Thus, for example, film directors use camera motion (panning, zooming) to show the connection between two events. Imagine a shot where two actors A and B are speaking to each other in a front of stable background. When actor A is speaking, the camera focuses on him. This corresponds to low activity over time (no major change of extracted feature points). When actor B starts to speak, the camera pans to him. This panning corresponds to high activity over the corresponding frames. Then, as the camera comes to rest on actor B, the activity level falls to a low value again. Key frames are selected from the low-activity frames, i.e. flat parts in FIG. 3.

The use of compressed video will make the algorithm faster. However, the information, which is available in the compressed domain in order to perform multi-target tracking is limited. A compromise can be to decode only the I-frames of the video sequence. The I-frames are then used for the video summarization algorithm as described herein.

This choice is motivated by three factors. First I-frames occur frequently, e.g. every 12 frames. This frame sub-sampling is acceptable since a shot lasts in average 5 to 23 seconds, see for example D. Colla, and G. Ghoma, "Image activity characteristics in broadcast television", IEEE Trans. Communications, vol. 26, pp. 1201–1206, 1976. Second, the algorithm as described herein is able to deal with large motion between two successive frames, thanks to the use of Kalman filtering. Third, I-frames, which can be JPEG-coded or coded in another still image format are accessible independently of other frames in the video sequence such as (B-, P-frames).

What is claimed is:

1. A method of extracting key frames from a video signal, comprising:

extracting feature points from frames in the video signal, tracking feature points between consecutive frames, measuring the number of new or lost feature points between consecutive frames, determining shot boundaries in the video signal when the number of new or lost feature points is above a certain threshold value, and selecting as a key frame, a frame located between two shot boundaries for which the number of new or lost feature points matches a predetermined criterion.

2. A method according to claim 1, wherein the threshold value is defined as the maximum between terminated and initiated feature points calculated as a percentage, where the percentage of initiated feature points is the number of new feature points divided by the total number of feature points in the current frame, and the percentage of terminated feature points is the number of removed feature points divided by the total number of feature points in the previous frame.

3. A method according to claim 1, wherein the key frame is selected as one of the frames for which the number of new or lost feature points is constant for a number of consecutive frames in the video signal.

4. A method according to claim 1, wherein the key frame is selected as a frame for which the number of new or lost feature points corresponds to a local minima between two shot boundaries or where the number below a certain pre-set threshold value.

5. A method according to claim 1, wherein when the video signal is a compressed video signal comprising I-frames, only the I-frames are decoded and used as input frames for determining shot boundaries and selecting key frames.

6. A method according to claim 1, wherein the feature points in the frames of the video signal are extracted using both kinematic components and photometric components of the video signal.

7. A method of shot boundary detection in a video signal, comprising:

extracting feature points from frames in the video signal, tracking feature points between consecutive frames, measuring the number of new or lost feature points between consecutive frames, and determining shot boundaries in the video signal when the number of new or lost feature points is above a certain threshold value.

8. A method according to claim 7, wherein the threshold value is defined as a maximum between terminated and initiated feature points calculated as a percentage, where the percentage of initiated feature points is the number of new feature points divided by the total number of feature points in the current frame, and the percentage of terminated feature points is the number of removed feature points divided by the total number of feature points in the previous frame.

9. A method according to claim 7, wherein feature points in the frames of the video signal are extracted using both kinematic components and photometric components.

10. A method according to claim 7, wherein when the video signal is a compressed video signal comprising I-frames, only the I-frames are decoded and used as input frames for determining shot boundaries and selecting key frames.

11. An apparatus for extracting key frames from a video signal, comprising:

means for measuring the number of new or lost feature points between consecutive frames, means for determining shot boundaries in the video signal when the number of new or lost feature points is above a certain threshold value, and means for selecting as a key frame, a frame located between two shot boundaries when the number of new or lost feature points matches a predetermined criteria.

12. An apparatus according to claim 11, wherein the threshold value is defined as a maximum between terminated and initiated feature points calculated as a percentage, where the percentage of initiated feature points is the number of new feature points divided by the total number of feature points in the current frame, and the percentage of terminated feature points is the number of removed feature points divided by the total number of feature points in the previous frame.

13. An apparatus according to claim 11, further comprising:

means for selecting the key frame as a frame for which the number of new or lost feature points is constant for a number of consecutive frames in the video signal.

14. An apparatus according to claim 11, further comprising:

means for selecting the key frame as a frame for which the number of new or lost feature points corresponds to a local minima between two shot boundaries or for which the number is below a certain pre-set threshold value.

15. An apparatus according to claim 11, wherein when the video signal is a compressed video signal comprising I-frames, the apparatus further comprises:

means for only decoding the I-frames and using the I-frames as input frames for determining shot boundaries and selecting key frames.

16. An apparatus according to claim 11, further comprising:

means for extracting feature points in the frames of the video signal using both kinematic components and photometric components of the video signal.

17. An apparatus for shot boundary detection in a video signal, comprising:

means for measuring the number of new or lost feature points between consecutive frames, and means for determining shot boundaries in the video signal when the number of new or lost feature points is above a certain threshold value.

18. An apparatus according to claim 17, wherein the threshold value is defined as a maximum between terminated and initiated feature points calculated as a percentage, where the percentage of initiated feature points is the number of new feature points divided by the total number of feature points in the current frame, and the percentage of terminated feature points is the number of removed feature points divided by the total number of feature points in the previous frame.

19. An apparatus according to claim 17, further comprising:

means for extracting feature points in the frames of the video signal using both kinematic components and photometric components of the video signal.

20. An apparatus according to claim 17, wherein when the video signal is a compressed video signal comprising I-frames, the apparatus further comprising:

means for only decoding the I-frames and using the decoded I-frames as input frames for determining shot boundaries.

21. A system for video summarization comprising an apparatus according to claim 11.

* * * * *